United States Patent [19]

Robers et al.

[11] Patent Number: 5,544,699
[45] Date of Patent: Aug. 13, 1996

[54] OIL COOLER WITH A SELF-FASTENING, SELF-ORIENTING PRESSURE RELIEF VALVE

[75] Inventors: Kevin J. Robers, Racine; Richard A. Bretl, Union Grove; Lawrence W. Gabbey, Racine; William J. Kerkman, Racine; Tod T. Kersher, Racine, all of Wis.

[73] Assignee: Modine Manufacturing Company, Racine, Wis.

[21] Appl. No.: 386,418

[22] Filed: Feb. 10, 1995

[51] Int. Cl.[6] ................................................. G05D 23/00
[52] U.S. Cl. ........................... 165/283; 165/103; 165/157
[58] Field of Search ............................ 165/38, 103, 119, 165/167, 916, 157

[56] References Cited

U.S. PATENT DOCUMENTS

| | | |
|---|---|---|
| 2,360,123 | 10/1944 | Gerstung et al. . |
| 3,743,011 | 7/1973 | Frost ........................................ 165/38 |
| 4,360,055 | 11/1982 | Frost ........................................ 165/38 |
| 4,561,494 | 12/1985 | Frost . |
| 4,580,625 | 4/1986 | Yamanaka et al. . |
| 4,638,856 | 1/1987 | Yamanaka et al. ...................... 165/119 |
| 4,669,532 | 6/1987 | Tejima et al. ............................ 165/36 |
| 4,831,980 | 5/1989 | Nasu et al. . |
| 4,967,835 | 11/1990 | Lefeber . |
| 5,236,043 | 8/1993 | Armbruster et al. . |

*Primary Examiner*—Allen J. Flanigan
*Attorney, Agent, or Firm*—Wood, Phillips, VanSanten, Clark & Mortimer

[57] ABSTRACT

A simple, reliable bypass valve construction (50) is provided for use in conjunction with a donut oil cooler (16) having an aluminum multi-piece housing (28). The bypass valve construction (50) is easily accessible and readily replaceable so as to lend itself to serviceability. The invention is incorporated in an oil cooler (16) having a housing (28) with a coolant inlet and outlet (42) and (44), and a surface (26) adapted to be sealed against an oil filter (14). The oil cooler (16) includes a plurality of interconnected heat exchange units (21) located inside the housing (28), with an oil inlet to one of the units and an oil outlet from another of the units. An oil bypass is provided through at least some of the interconnected heat exchange units (21) and communicates with a bypass outlet (62) in the housing surface (26). The bypass outlet (62) is normally closed by a bypass valve (52) which includes a generally C-shaped, sheet-like resilient flapper (54) with a valve element (56) sized to close the bypass outlet (62) and located intermediate the ends of the flapper (54). The ends of the flapper (54) have feet (64) and (66) which are received in slots (68) and (70) in the housing surface (26) to mount the flapper (54) on the surface (26) and to at least nominally locate the valve element (56) with respect to the bypass outlet (62).

11 Claims, 3 Drawing Sheets

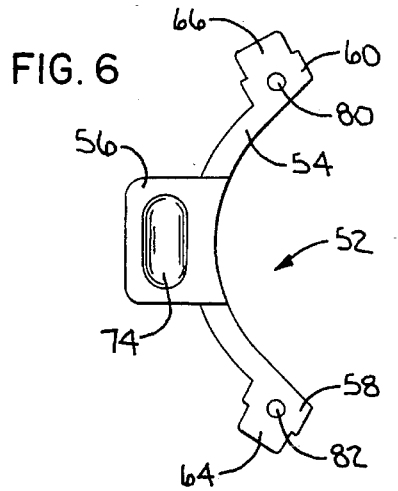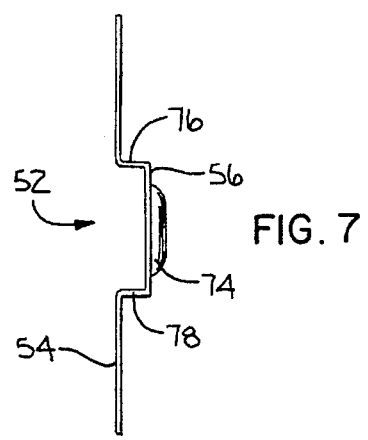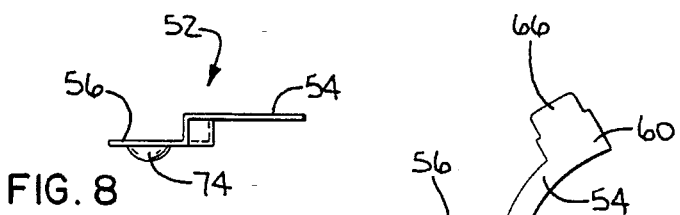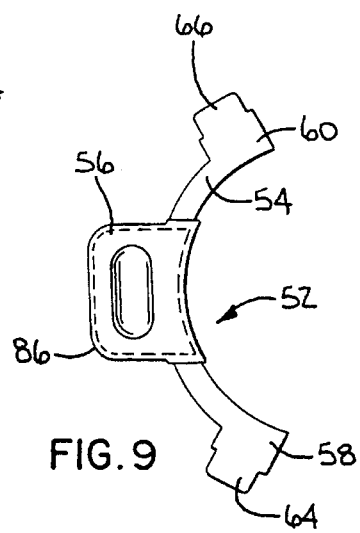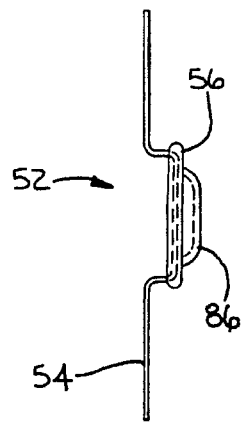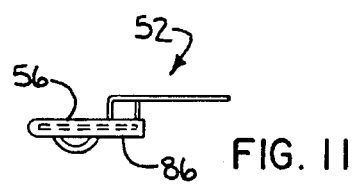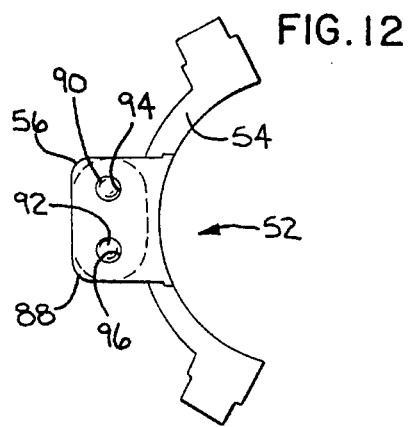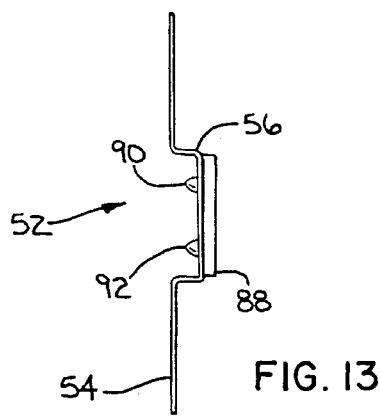

OIL COOLER WITH A SELF-FASTENING, SELF-ORIENTING PRESSURE RELIEF VALVE

FIELD OF THE INVENTION

This invention generally relates to the art of heat exchangers and, more particularly, to heat exchangers used as oil coolers in vehicular applications.

BACKGROUND OF THE INVENTION

The use of heat exchangers to cool lubricating oil employed in an internal combustion engine has long been known. One form of such heat exchangers currently in use is a so-called "donut" oil cooler. These oil coolers have an axial length of only a couple of inches or less and are constructed so that they may be interposed between the engine block and the oil filter, being attached direct to the block in a location formerly occupied by the oil filter.

Typically, oil coolers of this type include a multi-piece housing which is connected to the vehicular cooling system to receive coolant, and which contains a stack of relatively thin, disc-like chambers through which the oil to be cooled is circulated. It is common for the upper end of the heat exchanger to be defined by a stamped, sheet metal filter plate that is shaped to provide an annular peripheral chamber or dome which serves as a stabilizing mount for the oil filter when the filter is mounted to the heat exchanger. Normally, there is a central opening through the oil cooler through which an oil transfer tube extends to attach the oil cooler to the engine block and the oil filter to the oil cooler.

It is also common, in such oil coolers, to employ bypass valves to allow the oil to bypass the disc-like chambers when the oil is at a high viscosity, as when cold, and obviously not in need of further cooling in the heat exchanger. This prevents both a large pressure drop in the oil as it passes through the heat exchanger to the filter and the over pressurization of the oil cooler housing.

Typically, this bypass function is provided by a spring-biased poppet valve or a sheet metal flapper valve placed in the oil cooler between the central opening and the dome of the filter plate. Conventional flapper valves have a biasing spring that is located and contained by the interior of the dome of the filter plate, with a flapper extending inwardly towards the central opening. Conventional spring-biased poppet valves are inserted in the available area between the central opening and the dome. Both types of valves work well for their intended purpose.

However, due to current efforts in the automobile industry to increase fuel efficiency, there have been changes in the construction of the oil coolers which are incompatible with these conventional types of bypass valves.

One of the changes in construction is directed towards weight reduction and involves the use of aluminum for the multi-piece housing of the oil cooler. This presents a problem because standard flapper pressure relief valves and spring-biased poppet valves cannot be incorporated into the aluminum housing due to the thicker material gauge and unique construction configuration dictated by the use of aluminum.

More particularly, due to the thicker material gauge required of the aluminum construction, the interior of the annular chamber lacks sufficient size to contain and locate the spring-actuating portion of conventional flapper valves. The aluminum construction also requires a support column that extends through the central opening and is joined integrally with the housing. The size and location of the support column interferes with the valve-sealing portion of conventional flapper valves. Additionally, the support column does not allow room for insertion of a conventional spring-biased poppet valve.

Thus, it can be seen that there is a need for a new, reliable bypass valve that can be incorporated within an oil cooler having an aluminum multi-piece housing.

Another change in construction involves an adaptation to allow the oil cooler to mate with larger diameter, higher flow capacity oil filters. Increasing the diameter of the oil filter, rather than the length, allows for higher capacity filters to be installed in engine compartments without requiring room for additional length. Due to their stamped sheet metal configuration, conventional domed filter plates are limited as to the diameter of oil filter with which they can mate. One solution to this problem has been to replace the conventional domed plate with a flat, solid filter plate having a sealing surface that extends to the outermost diameter of the oil cooler. This allows the oil cooler to be mated with several different diameters of oil filters, including diameters that approximate the diameter of the oil cooler.

However, the use of the solid filter plate prevents the oil cooler from using a conventional flapper pressure relief valve. And, as noted earlier, conventional flapper valves require a dome/annular chamber for location and constraint. Further, spring-biased poppet valves require additional oil cooler length which increases the length of the oil cooler-filter assembly, the very thing sought to be avoided through the use of large diameter filters. Additionally, some users of such oil coolers are hesitant to employ spring-biased poppet valves, due to reliability concerns.

Thus, it can be seen that there is a need for a new and reliable bypass pressure relief valve which can be incorporated within an oil cooler having a solid, flat filter plate.

SUMMARY OF THE INVENTION

It is the principal object of the invention to provide a new and improved bypass valve configuration. More specifically, to provide a simple, reliable bypass valve configuration that can be used in conjunction with a donut oil cooler having an aluminum multi-piece housing. It is a further object of this invention that the bypass valve configuration be easily accessible and readily replaceable so as to lend itself to serviceability.

In a preferred embodiment, the invention is incorporated in an oil cooler having a housing with a coolant inlet and outlet, and a surface adapted to be sealed against an oil filter. The oil cooler includes a plurality of interconnected heat exchange units located inside the housing, with an oil inlet to one of the units and an oil outlet from another of the units. An oil bypass is provided through at least some of the interconnected heat exchange units and communicates with a bypass outlet in the housing surface. The bypass outlet is normally closed by a bypass valve which includes a generally C-shaped, sheet-like resilient flapper with a valve element sized to close the bypass outlet and located intermediate the ends of the flapper. The ends of the flapper have feet which are received in slots in the housing surface to mount the flapper on the surface and to at least nominally locate the valve element with respect to the bypass outlet.

According to one facet of the invention, the feet on the ends of the flapper are oppositely directed. According to another facet of the invention, the feet are directed radially outward.

According to still another facet of the invention, the valve element is sized to at least partially enter the bypass outlet so as to close the bypass outlet. Further, the slots and/or feet are spatially arranged to preload the flapper and to force the valve element to at least partially enter the bypass outlet.

In one embodiment of the invention, cooperating means are provided at or near the ends of the flapper and on the housing surface for connection together to mount the flapper on the housing surface and to at least nominally locate the valve element with respect to the bypass outlet. According to one facet of this embodiment, the cooperating means are in the form of protrusions carried on the ends of the flapper and apertures in the housing surface for receiving the protrusions to mount the flapper on the surface and to at least nominally locate the valve element with respect to the bypass outlet. According to another facet of this embodiment, the cooperating means operate to preload the valve element against the housing surface to close the bypass outlet.

Other objects and advantages will become apparent from the following specification taken in connection with the accompanying drawings.

BRIEF DESCRIPTION OF THE DRAWINGS

FIG. 6 is a top view of one embodiment of the bypass valve according to the invention;

FIG. 7 is a rear elevational view of the bypass valve shown in FIG. 6;

FIG. 8 is a side elevation view of the bypass valve shown in FIG. 6;

FIG. 9 is a top view of another embodiment of the bypass valve according to the invention;

FIG. 10 is a rear elevational view of the bypass valve shown in FIG. 9;

FIG. 11 is a side elevation view of the bypass valve shown in FIG. 9;

FIG. 12 is a top view of yet another embodiment of the bypass valve according to the invention; and FIG. 13 is a rear elevational view of the bypass valve shown in FIG. 12;

DESCRIPTION OF THE PREFERRED EMBODIMENTS

Figure 1:
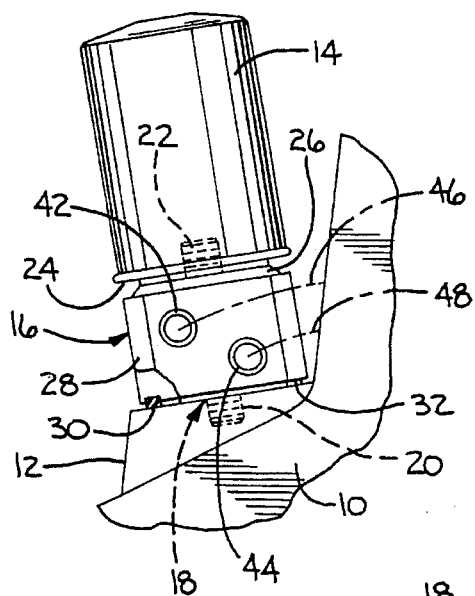
FIG. 1 is a side elevational view partially in section of an engine block having mounted thereon a heat exchanger oil cooler employing a bypass valve configuration embodying the invention, with an oil filter of the customary type in position superimposed on the oil cooler.

An exemplary embodiment of a heat exchanger made according to the invention is described herein and is illustrated in the drawings in connection with an oil cooling function for the lubricating oil of an internal combustion engine. However, it should be understood that the invention may find utility in other applications, and that no limitation to use as an oil cooler is intended except insofar as expressly stated in the appended claims.

With reference to FIG. 1, the block of an internal combustion engine is fragmentarily shown at 10 and includes a seat 12 which is normally adapted to receive an oil filter 14. In the case of the invention, however, a donut oil cooler, generally designated 16, is interposed between the oil filter 14 and the seat 12. More particularly, the heat exchanger 16 is held in sandwiched relation between the filter 14 and the seat 12 by an adapter/oil transfer tube, generally designated 18 and best shown in FIG. 2. The transfer tube 18 has one threaded end 20 that is threaded in the oil return port in the seat 12 and an opposite threaded end 22 which is threaded into the central opening of the filter 14.

Figure 2:
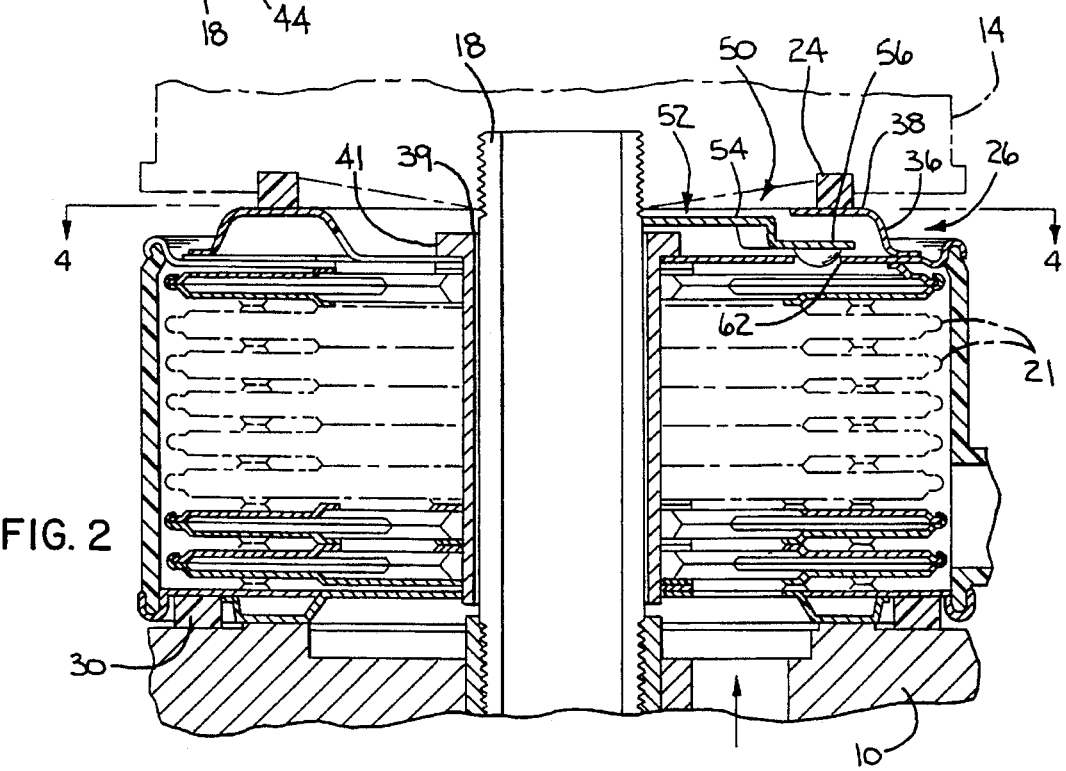
FIG. 2 is an enlarged, sectional view of the heat exchanger shown in FIG. 1, mounted on the engine block with a portion of the oil filter shown in dotted lines.

The seal 24 conventionally carried by the oil filter 14 sealingly engages one face 26 of a housing 28 for the heat exchanger 16. An O-ring seal 30 is interposed between the opposite face 32 of the housing 28 and the seat 12. As best seen in FIG. 2, the face 26 includes an annular chamber or dome 36 provided with a planar surface 38 which may be engaged by the seal 24 carried by the filter 14.

As seen in FIG. 2, the oil cooler has a central opening 39 defined by a support column 41. The transfer tube 18 passes through the central opening 39 so that it may engage both the filter 14 and the block 10.

Figure 4:
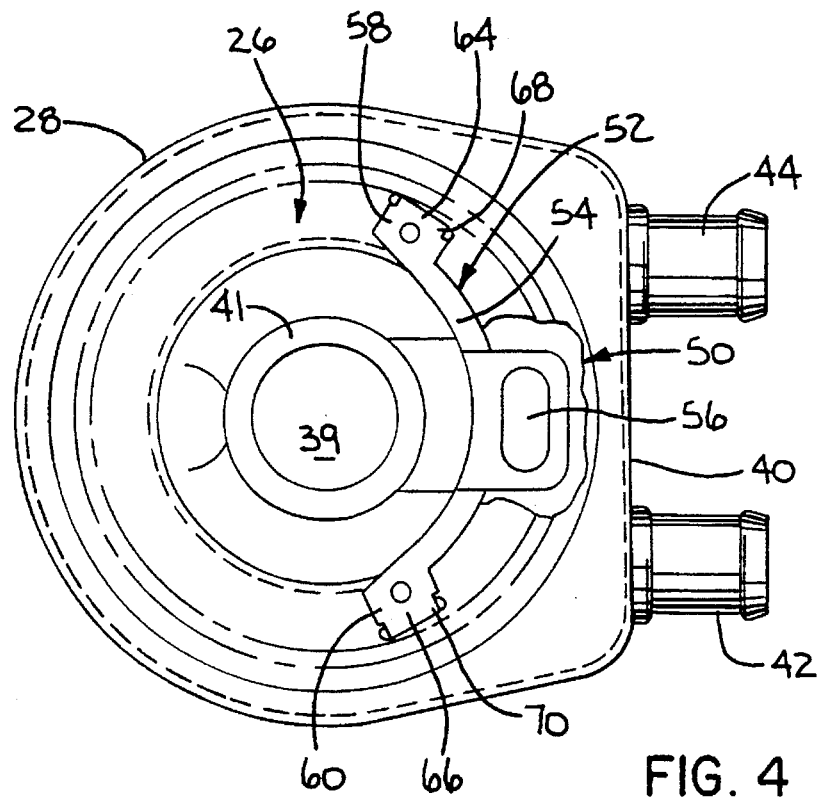
FIG. 4 is a top view of the heat exchanger shown in FIG. 2 taken substantially along the line 4—4 of FIG. 2, with a part broken away for clarity.
Figure 5:
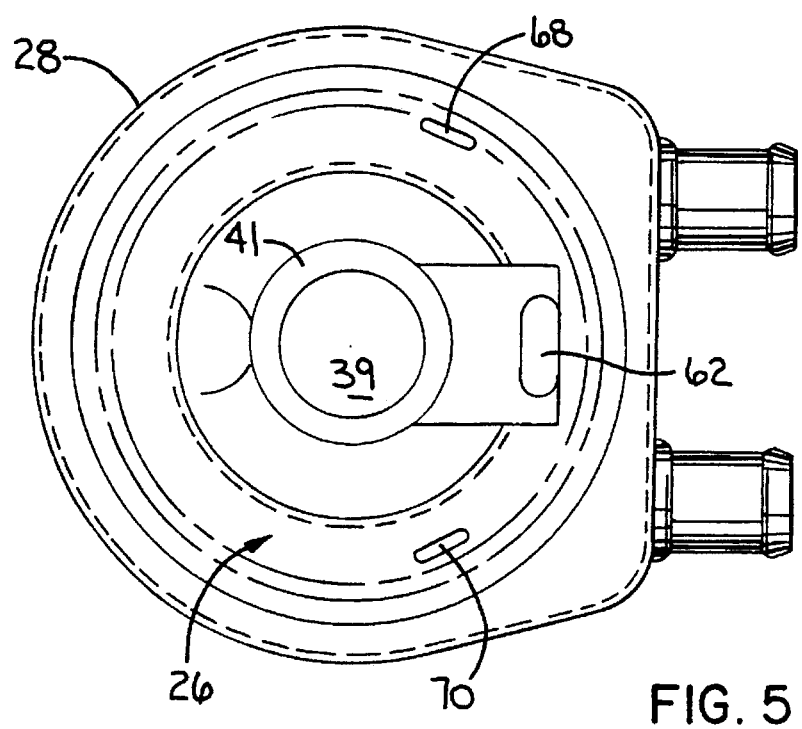
FIG. 5 is a view of the heat exchanger generally as shown in FIG. 4 with the bypass valve removed.

As seen in FIGS. 1 and 4, the housing 28 includes, on one side 40, spaced inlet and outlet nipples 42 and 44, respectively, which may be connected by hoses shown schematically at 46 and 48 in FIG. 1 into the coolant system for the internal combustion engine.

Turning now to FIGS. 2 and 4, the improved bypass valve construction 50 of the present invention is seen in greater detail. The construction 50 includes the bypass valve 52 mounted on the face 26. The bypass valve 52 includes a generally C-shaped, sheet-like resilient flapper body 54. Typically, this body will be made out of a suitable spring steel. A valve element 56 is located intermediate the ends 58 and 60 of the flapper body 54. The valve element 56 is sized to close a bypass outlet 62 in the housing surface 26. Radially outward directed feet 64 and 66 are located respectively on ends 58 and 60, and are received in slots 68 and 70 in the housing surface 26. The slots 68 and 70 and feet 64 and 66 cooperate to at least nominally locate the valve element 56 with respect to the bypass outlet 62.

It will be appreciated, that any suitable cooperating means at or near the ends 58 and 60 and on the surface 26 may be used to at least nominally locate the valve element 56 with respect to the bypass outlet 62. For example, any form of protrusion may be used on the ends 58 and 60 to engage any form of aperture in the surface 26. Further, the cooperating means may be in the form of protrusions on the surface 26 which are received by apertures on the ends 58 and 60 to nominally locate the valve element with respect to the bypass outlet.

In the preferred embodiment, the valve element 56 is sized to at least partially enter the bypass outlet 62, as best seen in FIG. 2. Further, the feet 64 and 66 and slots 68 and 70 are spatially arranged to preload the flapper 54 and thereby force the valve element 56 to at least partially enter the bypass outlet 62. This can be accomplished, for example, by spacing the slots 68 and 70 such that the feet 64 and 66 are compressed radially inward when in the installed state. This radially inward compression tends to bow the flapper body 54, thereby forcing the valve element 56 to enter the bypass outlet 62.

Figure 3:
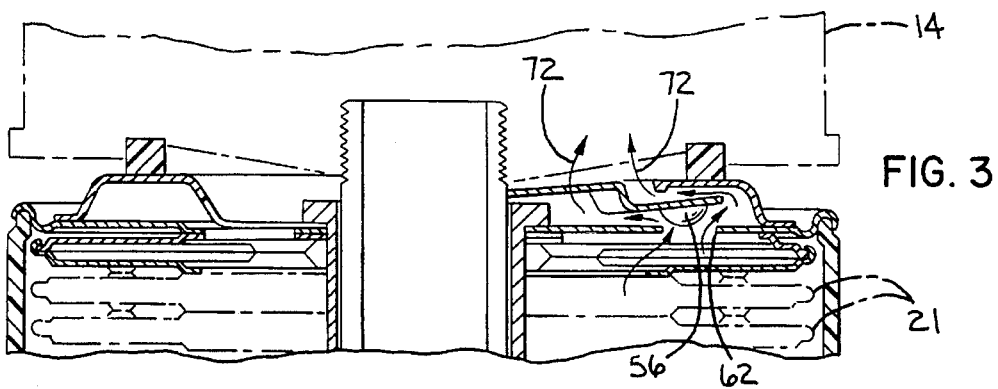
FIG. 3 is a view of the heat exchanger shown in FIG. 2 showing the bypass valve in the open position.

As best seen in FIG. 2, the bypass valve 52 is normally closed, with the valve element 56 seated in the bypass outlet 62. However, as seen in FIG. 3, when the viscosity of the liquid is high, such as in the case of cold oil, the pressure of the cold oil is sufficient to displace the valve element 56 upwardly to an open position, thereby permitting the oil to pass directly from the heat exchanger as indicated by arrows 72 and thus bypass much of the volume of the oil chambers 21.

Turning now to FIGS. 6, 7 and 8, the bypass valve 52 is shown in greater detail, removed from the oil cooler. In this embodiment, the valve element 56 includes an integrally-formed dimpled center 74 which is shaped and sized to mate with the bypass outlet 62. As best seen in FIG. 7, the flapper body 54 is stepped, at steps 76 and 78, to join with the valve element 56. These steps 76 and 78 bias the valve element 56 into the bypass outlet 62 when the feet 64 and 66 are compressed radially inward into engagement with the slots 68 and 70. Assembly holes 80 and 82 are provided in the ends 58 and 60 for engagement with an assembly tool 84 (not shown) which is used to compress the ends 58 and 60 radially inward so that feet 64 and 66 may be engaged or disengaged with slots 68 and 70.

Another embodiment of the bypass valve is shown in FIGS. 9, 10, and 11. In this embodiment, the valve element 56 has been coated with a suitable plastic, elastomeric, or composite material 86 to improve its sealing capabilities.

Yet another embodiment of the bypass valve is shown in FIGS. 12 and 13. In this embodiment, the valve element 56 has been provided with a separate rubber seal 88. The seal 88 is attached to the valve element 56 by two lock point tabs 90 and 92 which are formed integral with the seal 88 and which are in locked engagement with mating holes 94 and 96 in the valve element 56.

Thus, a simple, reliable bypass valve construction 50 is provided for use in conjunction with a donut oil cooler 16 having an aluminum multi-piece housing 28. The bypass valve construction 50 is easily accessible and readily replaceable so as to lend itself to serviceability.

We claim:

1. In an oil cooler including a housing, a coolant inlet to the housing, and coolant outlet from the housing, a housing surface adapted to be sealed against an oil filter, a plurality of interconnected heat exchange units within said housing, an oil inlet to one of said units, an oil outlet from another of said units, an oil bypass through at least some of said units, a bypass outlet in said housing surface and a bypass valve normally closing said bypass outlet, the improvement wherein said bypass valve comprises:

a generally C-shaped, sheet-like resilient flapper having ends;

a valve element carried by said flapper intermediate the ends of said flapper and sized to close the bypass outlet;

feet on said ends; and slots in said surface receiving said feet to mount said flapper on said surface and to at least nominally locate said valve element with respect to said bypass outlet.

2. The improvement of claim 1 wherein said feet on said ends are oppositely directed.

3. The improvement of claim 1 wherein said feet on said ends are directed radially outward.

4. The improvement of claim 1 wherein said valve element is sized to at least partially enter said bypass outlet to close the same.

5. The improvement of claim 4 wherein at least one of said slots and said feet are spatially arranged to preload said flapper and force said valve element to at least partially enter said bypass outlet.

6. In an oil cooler including a housing, a coolant inlet to the housing, and coolant outlet from the housing, a housing surface adapted to be sealed against an oil filter, a plurality of interconnected heat exchange units within said housing, an oil inlet to one of said units, an oil outlet from another of said units, an oil bypass through at least some of said units, a bypass outlet in said housing surface and a bypass valve normally closing said bypass outlet, the improvement wherein said bypass valve comprises:

a generally C-shaped, sheet-like resilient flapper having ends;

a valve element carried by said flapper intermediate the ends of said flapper and sized to at least partially enter said bypass outlet to close the same;

oppositely directed feet on said ends; and slots in said surface receiving said feet to mount said flapper on said surface and to at least nominally locate said valve element with respect to said bypass outlet.

7. The improvement of claim 6 wherein said oppositely directed feet are directed radially outward.

8. The improvement of claim 6 wherein at least one of said slots and feet are spatially arranged to preload said flapper to force said valve element to at least partially enter said bypass outlet.

9. In an oil cooler including a housing, a coolant inlet to the housing, and coolant outlet from the housing, a housing surface adapted to be sealed against an oil filter, a plurality of interconnected heat exchange units within said housing, an oil inlet to one of said units, an oil outlet from another of said units, an oil bypass through at least some of said units, a bypass outlet in said housing surface and a bypass valve normally closing said bypass outlet, the improvement wherein said bypass valve comprises:

a generally C-shaped, sheet-like resilient flapper having ends;

a valve element intermediate the ends of said flapper and sized to close the bypass outlet; and cooperating means at or near said ends and on said surface for connection together to mount said flapper on said surface and to at least nominally locate said valve element with respect to said bypass outlet.

10. The improvement of claim 9 wherein:

said cooperating means is in the form of protrusions carried on said ends and apertures in said surface receiving said protrusions to mount said flapper on said surface and to at least nominally locate said valve element with respect to said bypass outlet.

11. The improvement of claim 9 wherein said cooperating means are further operative to preload said valve element against said surface to close said bypass outlet.

* * * * *